United States Patent [19]
Karakelle et al.

[11] Patent Number: 5,091,443
[45] Date of Patent: Feb. 25, 1992

[54] COMPOSITION FOR GELLING LIQUIDS

[75] Inventors: Mutlu Karakelle, Centerville; Carl D. Benson, Waynesville; Robert A. Taller, Centerville; David E. Spielvogel, Springboro, all of Ohio

[73] Assignee: Becton, Dickinson and Company, Franklin Lakes, N.J.

[21] Appl. No.: 476,869

[22] Filed: Feb. 7, 1990

[51] Int. Cl.⁵ .............................................. C08L 251/00
[52] U.S. Cl. .................................. 424/665; 524/53; 525/54.31; 525/54.32; 424/667; 514/636; 514/735
[58] Field of Search .............. 525/54.31, 54.32, 100; 523/122; 424/81; 524/53

[56] References Cited

U.S. PATENT DOCUMENTS

| | | | |
|---|---|---|---|
| 3,491,036 | 1/1970 | Fenn | 523/209 |
| 3,661,815 | 5/1972 | Smith | 525/54.32 |
| 3,997,484 | 12/1976 | Weaver et al. | 525/54.31 |
| 4,302,369 | 11/1981 | Elmquist | 524/734 |
| 4,384,580 | 5/1983 | Leviton | 604/119 |
| 4,451,387 | 5/1984 | Tai | 252/174.15 |
| 4,495,226 | 1/1985 | Smith | 427/320 |
| 4,507,438 | 3/1985 | Obayashi et al. | 525/119 |
| 4,748,069 | 5/1988 | Cullen | 428/195 |
| 4,755,560 | 7/1988 | Ito et al. | 525/100 |
| 4,818,292 | 4/1989 | Iley et al. | 106/210 |
| 4,985,023 | 11/1991 | Blank et al. | 604/360 |

FOREIGN PATENT DOCUMENTS 56-147805  11/1981  Japan ............................... 525/54.32

*Primary Examiner*—Melvyn I. Marquis
*Assistant Examiner*—R. Deans
*Attorney, Agent, or Firm*—Richard E. Brown

[57] ABSTRACT

A gelling composition for an aqueous liquid includes ungellated starch which has been reacted with a silane coupling agent. In preferred compositions, the starch is a starch-polyacrylate graft copolymer and the composition includes a polyacrylate gelling agent. A disinfectant may be added to the composition for compositions intended for use with medical waste.

7 Claims, No Drawings

COMPOSITION FOR GELLING LIQUIDS

BACKGROUND OF THE INVENTION

1. Field of the Invention

This invention relates to prevention and cleanup of spills, and more particularly relates to a composition for converting a liquid to a gel which is useful in prevention or cleanup of spills.

2. Background of the Invention

Many occasions arise when it is necessary to clean up a spilled liquid. It is common practice to add a material capable of absorbing many times its weight of liquid without dissolving in the liquid. In this way, the spill may be cleaned up essentially by sweeping or vacuuming a solid. A variety of liquid absorbents are commercially available for this purpose.

Spills are of particular concern in the medical arena. There is a general apprehension on the part of public health officials worldwide concerning spilled body fluids potentially contaminated with hepatitis, AIDS or other infectious diseases. A particular area of concern arises in surgical procedures which often require body fluids to be drained from the patient.

For drainage of body fluids during surgery, suction canisters are used. In general, suction canisters employ a collection system and a vacuum source, such as a pump, to facilitate this drainage procedure. Each canister generally includes a flexible line or hose connected to the vacuum source so that vacuum can be applied to the interior of the canister. Another flexible line or hose extends from the canister to the source of body fluids in the patient. Once the vacuum is applied, a negative pressure gradient is communicated through the interior of the suction canister so that body fluids are drawn into the canister. Suction canisters and structure allowing multiple units to be connected in series is disclosed in U.S. Pat. No. 4,384,580 to Leviton.

Upon completion of the surgery, the canister containing the waste fluids must be discarded in a safe and environmentally sound way. This often requires storing and transporting canisters filled with liquids, a procedure fraught with the possibility of leaks and spills. It has become common practice in the art to add a material to the canister to convert the liquid to a solid or semisolid so that, if an accident should occur, any spill will be confined to the immediate area and cleanup will be quicker and safer.

For this purpose, gelling agents have been used. Gelling agents, in granular form, imbibe water, swell to many times their original size and fix the entire highly solvated intermolecular bonds. Cullen, in U.S. Pat. No. 4,748,069, discloses a packet containing sodium polyacrylate. When placed in a suction canister containing body fluids, the packet degrades so that the polyacrylate comes into contact with and immobilizes the fluid as a gel. Commercial products using polyacrylate gelling agents for suction canisters are RED-Z ™ (Medzam, Ltd., North Tonowanda, New York), and LIQUI-SORB ® (American Colloid Co., Arlington Heights, Ill.).

Starch is a polymer having repeating carbohydrate units which occurs in abundance in many plants. Commercial sources are corn, potatoes, tapioca, rice and wheat. Starch is well-known to undergo irreversible gellation in hot water, but is insoluble in cold water. Gellation in water at room temperature, however, can be induced by chemical modification.

The term modified starch refers to a product which is water soluble and forms a gel at room temperature. Modified starches are formed from starch by acetylation, chlorination, hydrolysis or enzymatic treatment of the starch and are used as textile sizing agents and paper coatings. Starch derivatized with carboxylate, sulfonate or sulfate groups forms alkali metal and ammonium salts which form nongelling dispersions of high viscosity. Crosslinking of the carbohydrate groups gives high viscosity products useful as thickeners.

Starch may also be modified to absorb liquid at room temperature by graft polymerization of hydrophilic groups. Highly absorbent products consisting of starch modified with pendent grafted acrylonitrile, acrylamide and sodium acrylate groups are disclosed in U.S. Pat. Nos. 3,661,815 and 4,302,369 and are available from Grain Processing Corp., Muscatine, Iowa, under the trade name WATER-LOCK ®.

Silicone treated starches are known. Gelatinized starch granules treated with a silicone oil and coated with wax are disclosed to be suds control agents in U.S. Pat. No. 4,451,387. U.S. Pat. No. 4,818,292 discloses particles of swollen hydrated hydrophilic starch coated with silicone oil as an antifoam additive for detergent powders. In U.S. Pat. No: 3,491,036, starch is rendered hydrophobic by treatment with a silicone resin and used as an anti-offset agent in printing. Starch treated with organosiloxane polymers are disclosed to be useful as a glue, binder, filler or coating in U.S. Pat. No. 4,495,226.

Modified starches form gels rapidly in cold water and have a very high ultimate capacity for liquid absorption, but have the drawback that clumping occurs on initial contact of the granules with water. The clumps have a barrier of gelled starch surrounding ungelatinized granules. Because of clumping, a long time is required for maximum water absorption. There is a need for a starch modified to overcome this deficiency and render inexpensive starch useful as an effective gelling agent. The present invention fulfills this need.

SUMMARY OF THE INVENTION

A gelling composition for an aqueous liquid includes starch which has been chemically modified by reaction with a silane coupling agent. In preferred gelling compositions of the invention, the starch is a starch-polyacrylate graft copolymer, and the composition also includes a polyacrylate gelling agent. The preferred composition may also include a disinfectant such as calcium hypochlorite.

Thus, the invention provides a composition including silylated starch having a very high capacity for liquid absorption. In contrast to starch lacking the silane treatment, the composition of the invention imbibes aqueous liquids at room temperature and overcomes the clumping problem encountered when ordinary starch or unsilylated starch polyacrylate copolymer contacts water.

While suction canisters are contemplated as a primary use, a variety of other applications are envisioned for the composition of the invention. In fact, the composition has application in any area requiring liquid absorption, such as disposable diapers, sanitary products, thickening agents, industrial water absorption and cleanup of spills.

The composition of the invention advances the art in making possible the use of abundant and inexpensive starch as a superabsorbent, an application not hitherto realized commercially because of the clumping.

DETAILED DESCRIPTION

While the invention is satisfied by embodiments in many different forms, there will herein be described in detail preferred embodiments of the invention, with the understanding that the present disclosure is to be considered as exemplary of the principles of the invention and is not intended to limit the invention to the embodiments described. The scope of the invention will be measured by the appended claims and their equivalents.

In its broadest scope, the gelling composition of the invention includes ungellated starch modified by reaction with a silane coupling agent. In the preferred composition of the invention, the substrate for silylation is an ungellated starch acrylic acid copolymer modified with the silane coupling agent. The composition of the invention imbibes water without clumping at room temperature. The invention will hereinafter be described in terms of the preferred starch-polyacrylate copolymer.

Suitable starch acrylic acid copolymeric starting materials are the products disclosed in the aforementioned U.S. Pat. Nos. 3,661,815 and 4,302,369 available commercially under the trade name WATER-LOCK ®. A variety of products having different starch-acrylate ratios and different mesh sizes ranging from 20 to 200 are available. Any starch modified with grafted acrylic acid derivatives may be used. The preferred modified starch copolymer is WATER-LOCK ® D-212 having pendant acrylamide and acrylic acid salts grafted thereto. Suitable acrylic acid salts are the sodium, potassium, calcium and aluminum salts. While any particle mesh size from 20 to 200 may be used, it has been found that the fastest clump-free gel is formed if the copolymer to be silylated has a mesh size of about 40 to 100.

The starch or starch polyacrylate copolymer may be treated with a silane coupling agent. Preferred silane coupling agents have the structure

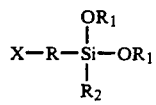

wherein R may be lower alkyl of 1 to 6 carbon atoms, $R_1$ may be lower alkyl of 1 to 3 carbon atoms, $R_2$ may be $R_1$ or $OR_1$ and X may be OH, $OR_1$, oxirane, $NH_2$, Cl or Br. These products are all known and are either commercially available (Petrarch Systems, Inc., Bristol, Pa., or Union Carbide Chemicals and Plastics Co., Inc., Danbury, Conn.) or may be prepared by standard synthetic methods well-known in the art. In preferred silane coupling agents, X is an amino group and $R_2$ is an alkoxy group. The most preferred coupling agent is aminopropyltriethoxysilane.

The silane coupling agent reacts to form a covalent bond to the starch substrate. It is believed, although not yet substantiated, that an alcohol group of the starch-acrylic acid copolymer displaces an alkoxy group from the coupling agent to give the silane modified starch polyacrylic acid copolymer of the invention.

It has been found that the covalent coupling of the silane to the copolymer occurs readily under mild conditions. Mixing of a solution of the silane in a nonaqueous solvent, such as an alcohol, with the copolymer particles effects the silylation at ambient temperature. A preferred procedure for silylation is a substantially dry blending of the reagents. Thus, a mixture of the dry particles and enough of the silane in ethanol merely to wet the particles may be stirred or tumbled for about 15 minutes to 24 hours. The solution of silane in ethanol may be about 1 to 30, preferably about 20%. (In the present disclosure, all percentages are by weight unless otherwise specified.) In the most preferred procedure, the ethanol is flashed off at about 60° C. and the particles left at ambient temperature for about 24 hours. Details of the preferred procedure are given in Example I.

When the silane modified copolymer and up to 78 g/g of water or saline are mixed in a vessel, a homogeneous clump free gel is formed which does not flow even when the vessel is turned upside down. Gels formed from the gelling agent of the invention are clear, homogeneous and stable for a period of two months or more. In contrast, gels formed from commercial polyacrylate gelling agents begin to deteriorate (i.e., return to a liquid state) in a matter of several days and become a slush.

On the other hand, polyacrylate gelling agents of the prior art are faster, and gellation is complete after mixing in about 1 to 15 minutes. Accordingly, the invention also contemplates a gelling composition including the silylated starch-polyacrylate copolymer of the invention and a polyacrylate gelling agent. Preferred polyacrylate gelling agents are metal salts of polyacrylic acid, preferably sodium and aluminum salts, or copolymers of polyacrylic acid and other polyacrylate derivatives, such as polyacrylamides. A preferred polyacrylate is available under the trade name Aqua-Keep ® available from Sanyo Corporation of America. The composition may include about 50 to 100% preferably 60 to 80% of the silylated starch and about 0 to 50%, preferably about 20 to 40% of the polyacrylate. This composition combines the nonclumping feature and prolonged stability of gels formed with silylated starch with the rapid induction of gellation by the polyacrylate.

It is believed that the prolonged gel stability exhibited by the silylated starch is due to chemical crosslinking of the gel. Crosslinking occurs because of the plurality of reactive $OR_1$ and $R_2$ groups in the silane coupling agent and the OH groups in the starch. The prolonged stability of the crosslinked gel is highly advantageous in a hospital setting where filled suction canisters are often stored in a holding area prior to transport of a large number of canisters at the same time to a disposal site.

For some applications of the gelling composition of the invention, particularly medical applications such as in suction canisters, it is advantageous to include a disinfectant in the composition. Any conventional disinfectant may be used, such as chlorhexidine or a salt thereof, hexachlorophene and iodine, preferably in an iodophore. A preferred disinfectant is calcium hypochlorite in a concentration of 0.5 to 5%, preferably about 3.0%.

The polyacrylate and calcium hypochlorite may be combined with the silylated starch by any convenient method. A preferred method is simple dry blending of the three powders in a mixer.

The following examples are provided to further illustrate the invention but are not to be considered as limitative of the invention.

EXAMPLE I

A solution of 20% by weight of aminopropyltriethoxysilane in ethanol was prepared. About 30 ml of this solution and 100 g WATER-LOCK® D-212 were combined in a mixer and mixed for about 30 minutes at room temperature. The temperature was raised to 60° C. and the ethanol flashed off in a convection oven at 60° C. The resulting dry powder was set aside at room temperature for about a day to complete the silylation reaction, then used as a gelling agent as described in Example III.

EXAMPLE II

In the same way as described in Example I, N-(2-aminoethyl)-3-aminopropyltrimethoxysilane (Dow Corning Z 6020) and (3-glycidoxypropyl)trimethoxysilane (Petrarch G 6720) are reacted with the modified starch-acrylic acid graft copolymer to give gelling agents which imbibe water or saline to give nonclumping gels of prolonged stability.

EXAMPLE III

A. Three parts by weight of the gelling agent of Example I was sprinkled onto the surface of about 100 parts by weight of water or normal saline in a beaker. The particles of gelling agent were seen to disperse uniformly throughout the liquid. Gel formation began immediately and, after 2 minutes, the gel was homogeneous with no evidence of clumps. The beaker was turned upside down with no spillage. The gel was still solid after more than 30 days storage at RT.

B. In the same way as described in Part A, WATER-LOCK® D-212 absent the silylation treatment was sprinkled onto the surface of water or saline. The WATER-LOCK® particles did not disperse evenly but instead formed clumps, some of which fell to the bottom of the beaker. Clumps were still visible after 24 hours at room temperature.

EXAMPLE IV

Three grams each of the following three gelling compositions were added to 100 ml of 0.9% saline:
 (A) composition of Example I containing 3.0% calcium hypochlorite
 (B) RED-Z ™
 (C) AQUA-KEEP® polyacrylate superabsorbent with 3.0% calcium hypochlorite.

The gels formed were observed after 15 minutes and then after 3, 7 and 30 days both at room temperature and at 43° C. (accelerated aging test). The following results were obtained.

| TIME | A RT | A 43° C. | B RT | B 43° C. | C RT | C 43° C. |
|---|---|---|---|---|---|---|
| 15 min. | SG | SG | SG | SG | SG | SG |
| 3 | SG | SG | SG | LG | SG | LG |
| 7 | SG | SG | LG | L | LG | L |
| 30 | SG | SG | L | L | L | L |

SG = solid gel
LG = loose gel
L = liquid

It is seen from the above table that the composition of the invention (A) gave a solid gel of extended stability (more than 30 days at 43° C.). This result may be compared with two commercial gelling agents which have begun to revert to a liquid after 7 days at room temperature and after 3 days at 43° C.

What is claimed is:

1. A gelling composition for an aqueous liquid comprising a mixture of a first particle of an ungellated, silylated graft copolymer wherein the graft copolymer is starch grafted with an acrylic acid derivative and a second particle of a gelling agent selected from the group consisting of a polyacrylic acid metal salt, a copolymer of polyacrylic acid and polyacrylamide and mixtures thereof.

2. The composition of claim 1 wherein the graft copolymer of said first particle has been silylated by reaction with a silane coupling agent selected from the group having the structure

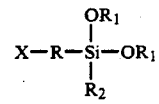

wherein R is lower alkyl of 1 to 6 carbon atoms, $R_1$ is lower alkyl of 1 to 3 carbon atoms, $R_2$ is selected from the group consisting of $R_1$ and $OR_1$, and X is selected from the group consisting of OH, $OR_1$, oxirane, $NH_2$, Cl and Br.

3. The composition of claim 1 wherein the acrylic acid derivative of said first particle is a salt of acrylic acid selected from the group consisting of a sodium, potassium, calcium and aluminum salt.

4. The composition of claim 1 wherein said salt of the second particle is selected from the group consisting of a sodium salt and an aluminum salt.

5. The composition of claim 1 wherein said first and second particles have a mesh size of about 20 to 200.

6. A gelling composition for a aqueous liquid comprising a mixture of a first particle of an ungellated, silylated graft copolymer wherein the graft copolymer is starch grafted with an acrylic acid salt, a second gelling particle of a polyacrylic acid salt and a disinfectant.

7. The composition of claim 6 wherein said disinfectant is selected from the group consisting of calcium hypochlorite, chlorhexidine, hexachlorophene and iodine.

* * * * *